(12) United States Patent
Baker et al.

(10) Patent No.: US 12,589,687 B2
(45) Date of Patent: Mar. 31, 2026

(54) LIGHTING FEATURES FOR A LIFT GATE OF A VEHICLE

(71) Applicant: Rivian IP Holdings, LLC, Irvine, CA (US)

(72) Inventors: Simon Baker, Basingstoke (GB); Siobhan Marie Casey, Newport Beach, CA (US); Timothy Beaven, Bicester (GB); Micheal Richard Castiglione, Carlsbad, CA (US); Shammika Ashan Wickramasinghe, Banbury (GB)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/000,428

(22) Filed: Dec. 23, 2024

(65) Prior Publication Data

US 2025/0256638 A1     Aug. 14, 2025

Related U.S. Application Data

(60) Provisional application No. 63/553,620, filed on Feb. 14, 2024.

(51) Int. Cl.
*B60Q 1/26* (2006.01)
*B60Q 1/00* (2006.01)
*B60Q 1/30* (2006.01)
*B60Q 1/34* (2006.01)
*B60Q 1/44* (2006.01)

(52) U.S. Cl.
CPC ......... *B60Q 1/2661* (2013.01); *B60Q 1/0041* (2013.01); *B60Q 1/2607* (2013.01); *B60Q 1/34* (2013.01); *B60Q 1/44* (2013.01); *B60Q 1/304* (2022.05)

(58) Field of Classification Search
CPC .. B60Q 1/2661; B60Q 1/0041; B60Q 1/2607; B60Q 1/34; B60Q 1/44
See application file for complete search history.

(56) References Cited

U.S. PATENT DOCUMENTS

| | | | | |
|---|---|---|---|---|
| 6,508,563 B2 * | 1/2003 | Parker | ................. | B60Q 1/0082 362/85 |
| 7,175,321 B1 * | 2/2007 | Lopez | .................... | G09F 19/18 362/504 |
| 8,237,557 B1 * | 8/2012 | Hertz | ...................... | B60Q 7/02 340/468 |
| 9,849,830 B1 * | 12/2017 | Salter | ..................... | F21S 43/16 |
| 11,300,266 B1 * | 4/2022 | Singh | ................... | F21S 43/195 |
| 12,078,316 B1 * | 9/2024 | Foutch | ................... | F21S 43/14 |
| 12,129,986 B1 * | 10/2024 | Foutch | ................. | F21S 43/241 |
| 2003/0039126 A1 * | 2/2003 | Fox | ........................ | B60Q 1/302 340/479 |
| 2010/0171606 A1 * | 7/2010 | Law | ..................... | B60Q 1/2607 340/468 |
| 2014/0198510 A1 * | 7/2014 | Law | ........................ | B60Q 3/35 362/485 |

(Continued)

*Primary Examiner* — Bryon T Gyllstrom
(74) *Attorney, Agent, or Firm* — BAKERHOSTETLER

(57) ABSTRACT

Rear lighting systems of a vehicle may include lights sources that function as taillights, brake lights, turn lights, fog lights. Some lights sources may surround, or at least partially surround, other lights sources. Further, some light sources are mounted on a lift gate, and may be visible to other drivers and/or pedestrians behind the vehicle regardless of whether the lift gate is in an open or closed position.

20 Claims, 10 Drawing Sheets

(56)  References Cited

U.S. PATENT DOCUMENTS

| 2023/0097614 | A1* | 3/2023 | Tobie | ................... | B60Q 1/2696 |
| | | | | | 362/167 |
| 2023/0150421 | A1* | 5/2023 | Darlage | ............... | F21S 43/237 |
| | | | | | 362/549 |

* cited by examiner

800

PROVIDE A FIRST LIGHT SOURCE THAT
INCLUDES A FIRST END AND A SECOND END
OPPOSITE THE FIRST END                          802

POSITION A SECOND LIGHT SOURCE
AROUND THE FIRST END                            804

POSITION A THIRD LIGHT SOURCE
AROUND THE SECOND END                           806

LIGHTING FEATURES FOR A LIFT GATE OF A VEHICLE

CROSS-REFERENCE TO RELATED APPLICATION(S)

This application claims the benefit of priority to U.S. Provisional Application No. 63/553,620, filed Feb. 14, 2024, titled "LIGHTING FEATURES FOR A TAILGATE OF A VEHICLE", the disclosure of which is incorporated herein by reference in its entirety.

INTRODUCTION

The present disclosure is directed to vehicles, and more particularly, to various lighting features at a rear portion of vehicles, including a liftgate of vehicles.

SUMMARY

Vehicles may include several light sources in a rear portion of the vehicle, some of which provide different indications for different drive events (e.g., braking, turning, reverse). When the vehicle includes a lift gate, one or more lights sources are positioned on and carried by the lift gate. Some vehicles may include a lift gate that carries light sources for both side turn indication and braking. Alternatively, some may include a lift gate that carries light sources for side turn indication, while the light sources for braking are carried by the vehicle's body.

In one or more aspects of the present disclosure, an apparatus is described. The apparatus may include a first light source including a first end and a second end opposite the first end. The apparatus may further include a second light source that surrounds the first end. The apparatus may further include a third light source that surrounds the second end. The second light source and the third light source may be configured to illuminate to provide a vehicle indicator of a vehicle. The first light source, the second light source, and the third light source are configured to couple with a lift gate of the vehicle. The second light source and the third light source are configured to provide the vehicle indicator in a first position of the lift gate and in a second position of the lift gate.

The first light source may include a taillight. Each of the second light source and the third light source may include a U-shape. The first light source may be positioned between the second light source and the third light source. The vehicle indicator may include a turn event for the vehicle. The vehicle indicator may include a braking event for the vehicle.

In one or more aspects of the present disclosure, a lift gate is described. The lift gate may include a lift gate body configured to transition from a first position to a second position different from the first position. The lift gate may further include a first light source carried by the lift gate body. The first light source configured to provide a first light beam in accordance with a first indication. The lift gate may further include a second light source configured to provide a second light beam in accordance with a second indication different from the first indication The first light source may be further configured to direct the first light beam away from the vehicle in the first position or the second position.

The first position may include a closed position, and in response to the lift gate body in the closed position, the first light beam may be perpendicular with respect to the lift gate body. The second position may include an open position, and in response to the lift gate body in the open position, the first light beam may be parallel with respect to the lift gate body.

The lift gate may further include a lens carried by the lift gate body that covers the first light source and the second light source. The lens may define an edge of the lift gate body.

The second light source may be carried by the lift gate, and the second light source may be further configured to direct the second light beam away from the vehicle in the first position or the second position. The first light source may include a taillight, and the second light source may include a brake light. The second light source may at least partially surround the first light source. The first light source may be movable with respect to the second light source based the lift gate moving from the first position to the second position.

In one or more aspects of the present disclosure, a vehicle is described. The vehicle may include a vehicle body. The vehicle may further include a first apparatus coupled with the vehicle body. The first apparatus may include a first light source and a lens that covers the first light source and the lens. The vehicle may further include a spoiler coupled with the body, the spoiler at least partially covering the lens. The spoiler may define a space between the vehicle body, and the lens at least partially protrudes from the spoiler.

The vehicle may further include a lift gate coupled with, and rotatable with respect to, the vehicle body. The vehicle may further include a second apparatus carried by the lift gate. The second apparatus may include a first light source comprising a first end and a second end opposite the first end. The second apparatus may further include a second light source that surrounds the first end. The second apparatus may further include a third light source that surrounds the second end. The second light source and the third light source may be configured to simultaneously illuminate to provide an indication. The fog light may be below the lift gate in a closed position of the lift gate, and the fog light may be above by the lift gate in an open position of the lift gate,

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure is directed to lighting systems for vehicles. Various configurations and form factors of lighting system are shown and/or described herein, and may enhance the overall appearance of the vehicle. Some of the lighting systems may include one or more light sources located on and carried by a lift gate and thus movable with respect to the body of the vehicle. The light sources on the lift gate are generally viewable by pedestrians and/or passengers in other vehicles when the lift gate is closed. However, some light sources on the lift gate are viewable by pedestrians and/or passengers in other vehicles, even when the lift gate is opened. Additionally, light sources described herein may include a center high-mounted stop lamp (CHMSL) for added visibility for events (e.g., stop event) of the vehicle.

Figure 1:
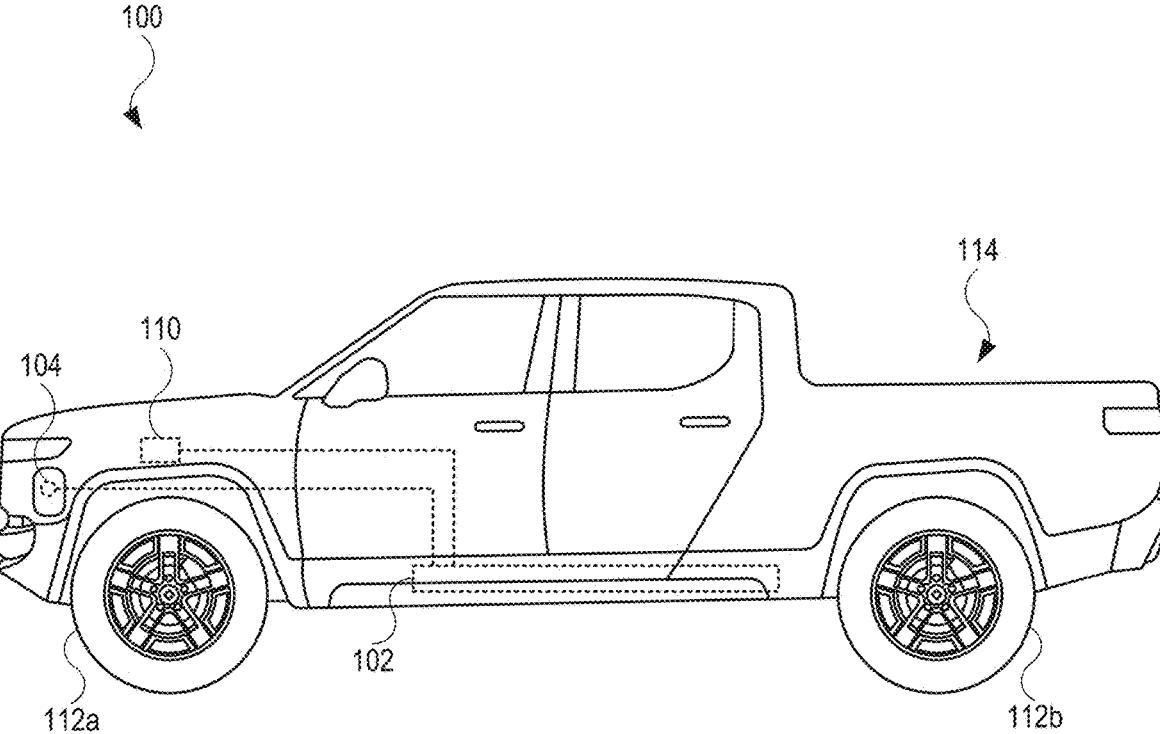
FIG. 1 illustrates a side view of an example of a vehicle, in accordance with one or more aspects of the present disclosure.

FIG. 1 illustrates an example of a vehicle 100, in accordance with aspects of the present disclosure. In the example shown in FIG. 1, the vehicle 100 takes the form of a truck. Generally, the vehicle 100 may take the form of any motorized vehicle, including motorized vehicles with an internal combustion engine and/or one or more electric motors. Accordingly, at least some implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple to a drive unit 110, representative of one or more drive units of the vehicle 100. While the drive unit 110 is shown as generally being in the front of the vehicle 100, the drive unit 110 may be located in the rear of the vehicle 100. Further, when multiple drive units are used, at least one drive unit may be in the front of the vehicle 100 to drive the front wheels (e.g., wheel 112a), and at least one drive unit may be in the rear of the vehicle 100 to drive the rear wheels (e.g., wheel 112b). The drive unit 110 may include, for example, a motor, an inverter, a gear box, and a differential. In the example shown in FIG. 1, the drive unit 110 takes the form of an electric motor. In this regard, the drive unit 110 may use energy (e.g., electrical energy) stored in the battery pack 102 for propulsion in order to drive (e.g., rotationally drive) wheels of the vehicle 100. The vehicle 100 may further include a bed 114 that may be used as a storage area for the vehicle 100.

Figure 2:
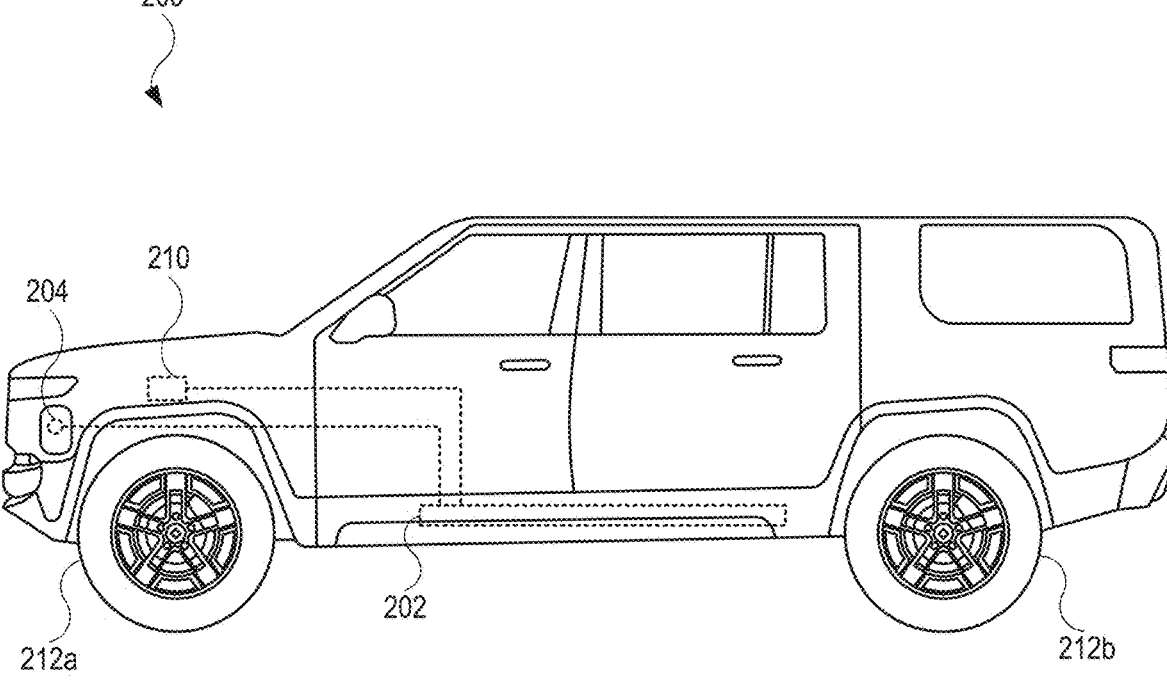
FIG. 2 illustrates a side view of an alternate embodiment of a vehicle, in accordance with one or more aspects of the present disclosure.

FIG. 2 illustrates a side view of an alternate example of a vehicle 200, in accordance with one or more aspects of the present disclosure. As shown, the vehicle 200 takes the form of a sport utility vehicle (SUV). The vehicle 200 may include several features shown and/or described for the vehicle 100 (shown in FIG. 1). For example, the vehicle 200 may include a battery pack 202, a port 204 (e.g., charge port), a drive unit 210 (representative of one or more additional drive units), a wheel 212a (representative of an additional front wheel), and a wheel 212b (representative of an additional rear wheel).

Figure 3:
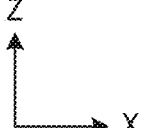
FIG. 3 illustrates a rear view of an embodiment of a vehicle, showing various light sources of the vehicle, in accordance with one or more aspects of the present disclosure.

FIG. 3 illustrates a rear view of an alternate embodiment of a vehicle 300, showing various light sources of the vehicle 300, in accordance with aspect, in accordance with one or more aspects of the present disclosure. The vehicle 300 may include a body 301 and a closure 312 rotationally coupled with the body 301. Accordingly, the closure 312 is rotatable with respect to the body 301. The closure 312 may take the form of a liftgate. Both the body 301 and the closure 312 may include one or more light sources. For example, the body 301 may include an apparatus 320a, an apparatus 320b, and an apparatus 320c that include and carry a light source 322a, a light source 322b, and a light source 322c, respectively. Each of the light sources 322a, 322b, and 322c may represent one or more lights sources and may perform different functions. For example, the light source 322a, when illuminated in accordance with a frequency (e.g., flashing, blinking), provides an indication of the vehicle 300, such as a vehicle indicator that the vehicle 300 is performing a turn event (e.g., a left turn). Similarly, the light source 322b, when illuminated in accordance with a frequency, provides an indication of the vehicle 300, such as another vehicle indicator that the vehicle 300 is performing an alternate turn event is performing a turn event (e.g., a right turn). The light source 322c, when illuminated, may provide another indication of the vehicle 300, such as a vehicle indicator that the vehicle 300 is performing a braking/stopping event. As shown, the closure 312 is in a closed position. However, the closure 312 may rotate away from the body 301 generally in the direction of the Z-axis (of Cartesian coordinates). Accordingly, the apparatus 320c is movable relative to the apparatus 320a and the apparatus 320b.

Additionally, the vehicle 300 may include an apparatus 320d that includes a light source (shown, not labeled). The vehicle 300 may further include a spoiler 324 coupled with and carried by the body 301. The spoiler 324 may cover and surround, or at least partially cover and surround, the apparatus 320d. While the spoiler 324 is attached to the body 301, several spaces or voids may be present. For example, a space 326a and a space 326b may be present between the spoiler 324 and the body. The spaces 326a and 326b represent locations through which air may pass while the vehicle 300 is in motion. In this regard, the vehicle 300 may provide enhanced aerodynamics while being driven.

Figure 4:
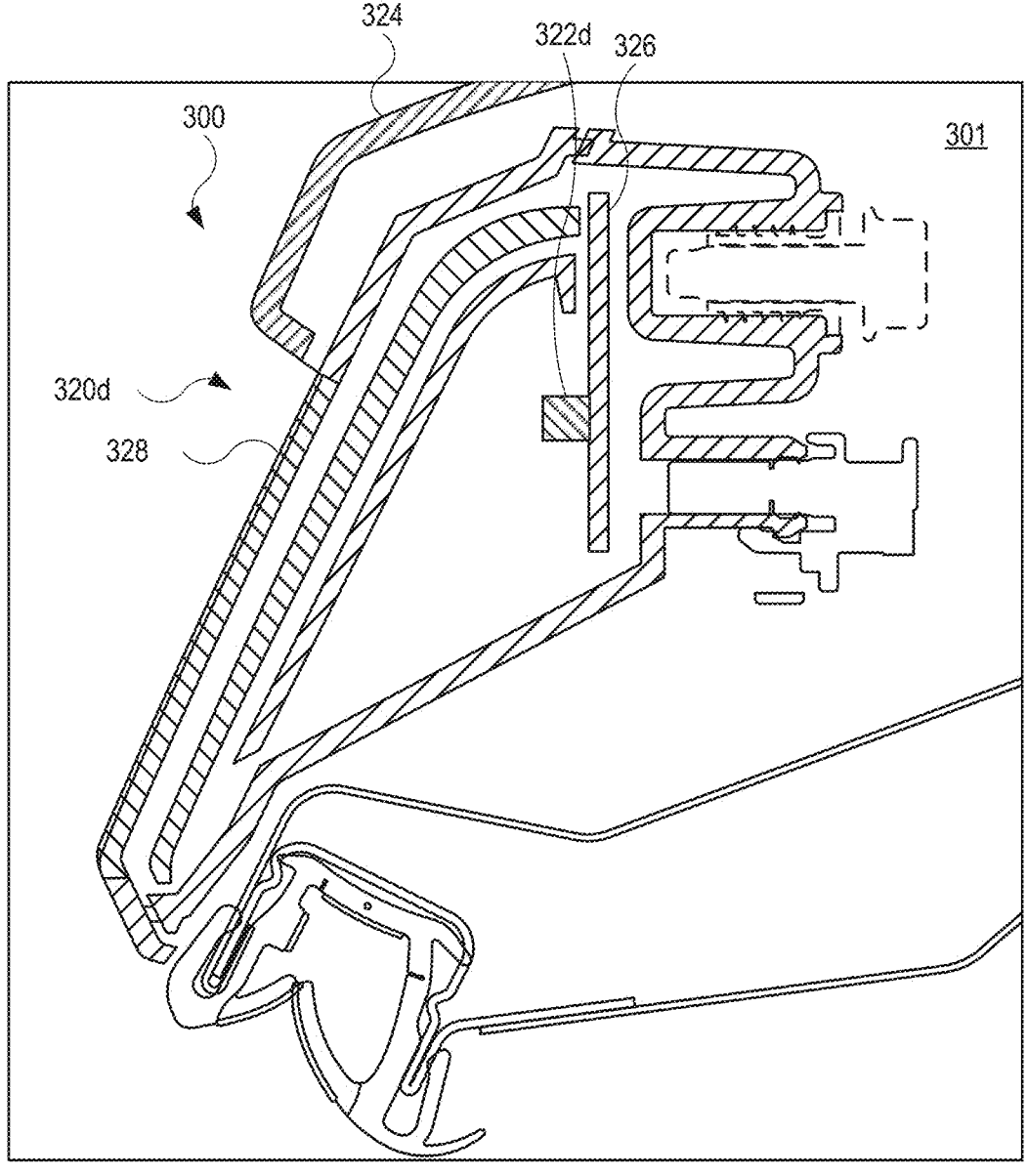
FIG. 4 illustrates a cross-sectional view of the vehicle shown in FIG. 3, showing the apparatus and the spoiler, in accordance with one or more aspects of the present disclosure.

FIG. 4 illustrates a cross-sectional view of the vehicle 300 shown in FIG. 3, showing the apparatus 320*d* and the spoiler 324, in accordance with aspect, in accordance with one or more aspects of the present disclosure. The apparatus 320*d* may couple with the body 301 of the vehicle 300. As shown, the apparatus 320*d* includes a circuit board 326 that carries a light source 322*d*. As shown, the spoiler 324 at least partially covers the apparatus 320*d*, including at least partially covering the light source 322*d* and the lens 328. However, the apparatus 320*d* may at least partially protrude from the spoiler 324. For example, the apparatus 320*d* may include a lens 328 that covers the light source 322*d* and at least partially protrudes from the spoiler 324.

Figure 5:
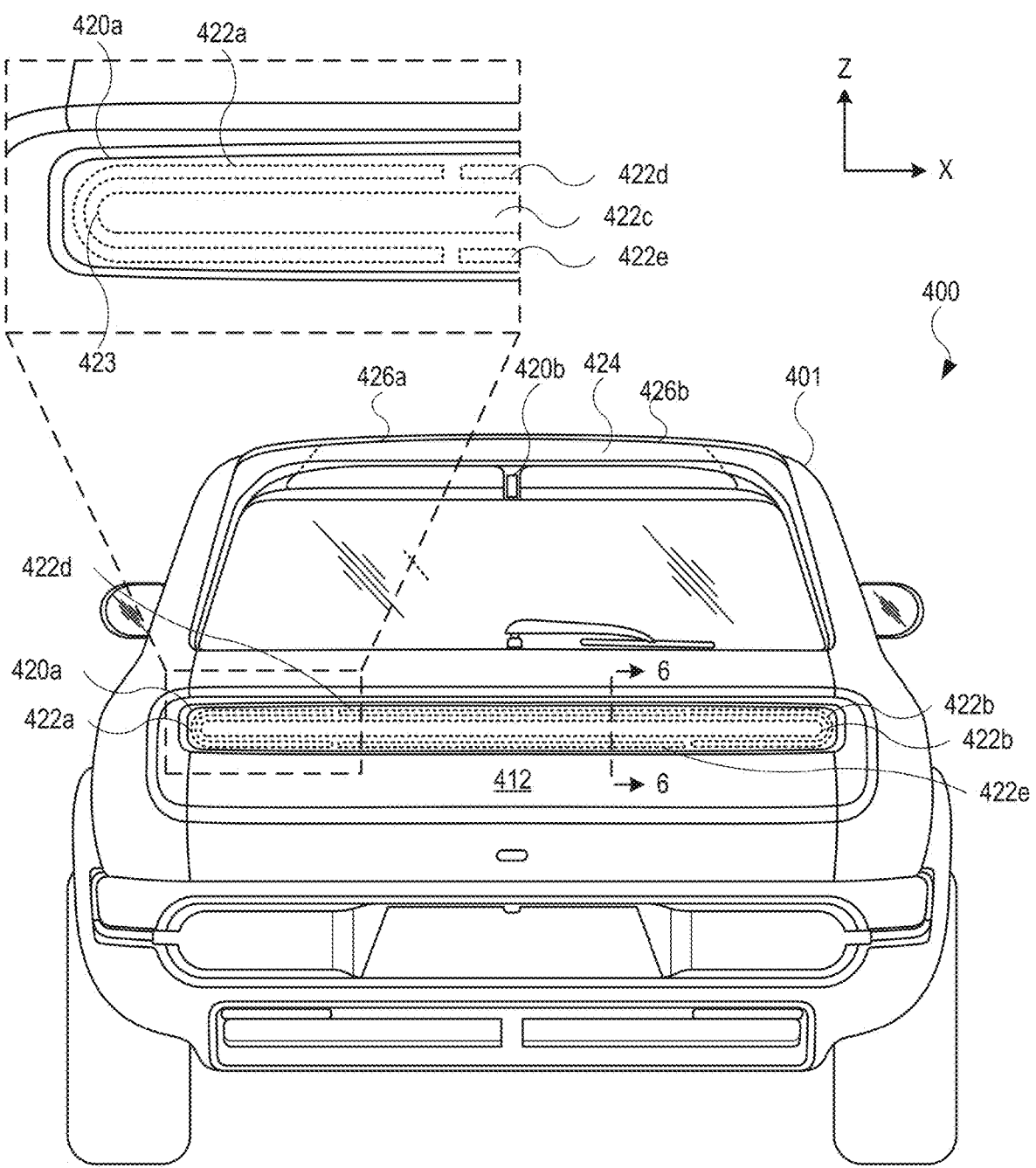
FIG. 5 illustrates a rear view of an alternate embodiment of a vehicle, showing various light sources of the vehicle, in accordance with one or more aspects of the present disclosure.

FIG. 5 illustrates a rear view of an alternate embodiment of a vehicle 400, showing various light sources of the vehicle 400, in accordance with aspect, in accordance with one or more aspects of the present disclosure. The vehicle 400 may include a body 401 and a closure 412 rotationally coupled with the body 401. The closure 412 may take the form of a liftgate. Both the body 401 and the closure 412 may include one or more light sources. For example, the body 401 may include an apparatus 420*a*. The apparatus 420*a* may include several light sources. For example, the apparatus 420*a* may include a light source 422*a*, a light source 422*b*, a light source 422*c*, a light source 422*d*, and a light source 422*e*. Each of the light sources 422*a*, 422*b*, 422*c*, 422*d*, and 422*e* may collectively or alternatively perform various functions. For example, the light source 422*a*, when illuminated in accordance with a frequency (e.g., flashing, blinking), provides an indication (e.g., vehicle indicator, vehicle turn indicator) that the vehicle 400 is performing a turn event (e.g., a left turn). Similarly, the light source 422*b*, when illuminated in accordance with a frequency, provides an indication (e.g., vehicle indicator, vehicle turn indicator) that the vehicle 400 is performing another turn event (e.g., a right turn). The light source 422*c*, when illuminated, may provide an indication (e.g., vehicle indicator) that the vehicle 400 is performing a braking/stopping event. In one or more implementations, the light sources 422*d* and 422*e* simultaneously illuminate to provide an indication (e.g., vehicle indicator) that the vehicle is performing a braking/stopping event. Further, the light sources 422*d* and 422*e* may simultaneously illuminate to provide indication of the presence of the vehicle 400 (e.g., visibility in the form of a taillight).

As shown in the enlarged view, some light sources may surround other light sources. For example, as shown in the enlarged view, the light source 422*c* includes an end 423 (e.g., a first end) that is representative of a second end opposite the end 423, and the light source 422*a* (representative of the light source 422*b*) surrounds the light source 422*c*. Similarly, the light source 422*b* surrounds the second end of the light source 422*c*. In this regard, each of the light sources 422*a* and 422*b* take the form of a C-shaped light source, with the light source 422*b* taking the form of a backward C-shape. Also, the light sources 422*d* and 422*e* surround the light source 422*c*.

Additionally, the vehicle 400 may include an apparatus 420*b* that includes a light source (shown, not labeled). The vehicle 400 may further include a spoiler 424 coupled with and carried by the body 401. The spoiler 424 may cover and surround, or at least partially cover and surround, the apparatus 420*b*. In one or more implementations, the spoiler 424 covers, including fully covers or shades, the apparatus

420*b*. While the spoiler 424 is attached to the body 401, several spaces or voids may be present. For example, a space 426*a* and a space 426*b* may be present between the spoiler 424 and the body. The spaces 426*a* and 426*b* represent locations through which air may pass while the vehicle 400 is in motion. In this regard, the vehicle 400 may provide enhanced aerodynamics while being driven.

As shown, the closure 412 is in a closed position. However, the closure 412 may rotate away from the body 401 generally in the direction of the Z-axis (of Cartesian coordinates). Accordingly, the apparatus 420*a* is movable relative to the apparatus 420*b*.

Figure 6:
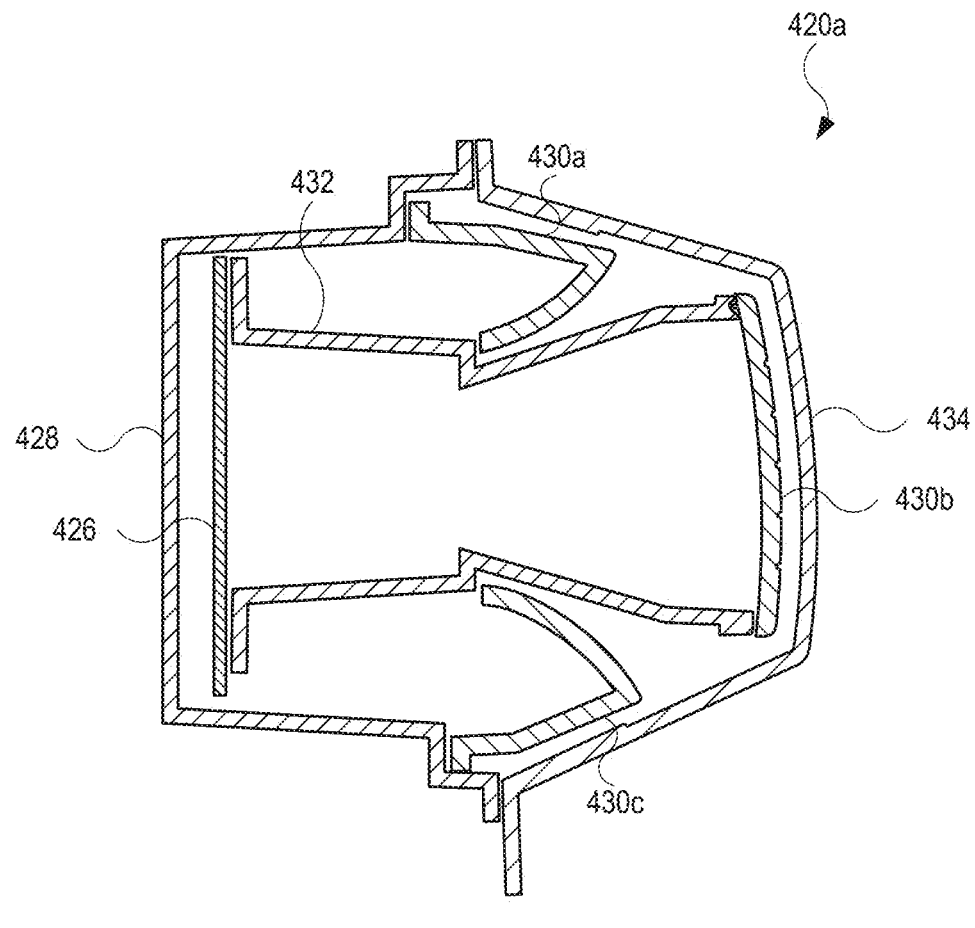
FIG. 6 illustrates a cross-sectional view of the apparatus shown in FIG. 5, taken along line 6-6, showing additional features of the apparatus, in accordance with one or more aspects of the present disclosure.

FIG. 6 illustrates a cross-sectional view of the apparatus 420*a* shown in FIG. 5, taken along line 6-6, showing additional features of the apparatus 420*a*, in accordance with one or more aspects of the present disclosure. The apparatus 420*a* may include a circuit board 426 that carries and electrically couples with light sources (e.g., light sources 422*a*, 422*b*, 422*c*, 422*d*, and 422*c* shown in FIG. 5). The apparatus 420*a* may further include a housing 428 that carries the circuit board 426. The apparatus 420*a* may further include a lens 430*a*, a lens 430*b*, and a lens 430*c*. The apparatus 420*a* may further include a bezel 432 that carries the lenses 430*a*, 430*b*, and 430*c*. The apparatus 420*a* may further include a lens 434 that covers the lenses 430*a*, 430*b*, and 430*c*, as well as the aforementioned light sources. The lens 434 may include a particular appearance (e.g., color) such that light transmitted through the lens 434 may take on the appearance.

Figure 7:
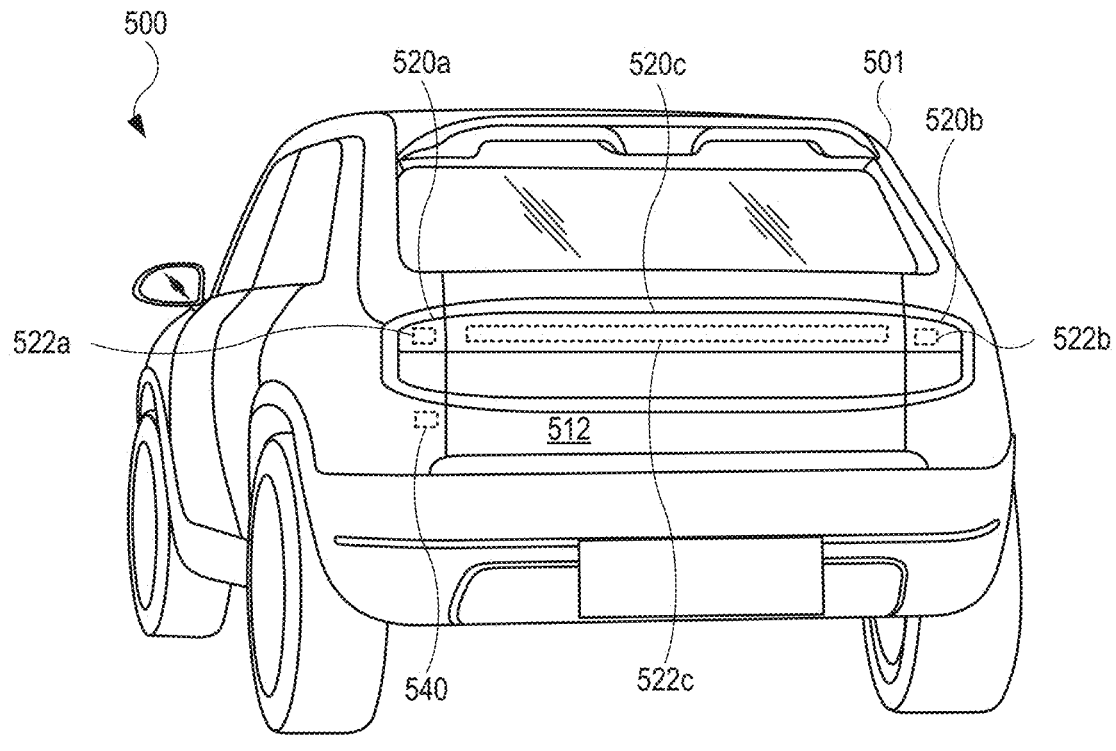
FIG. 7 and FIG. 8 illustrate rear views of an alternate example of a vehicle, showing an apparatus that moves with a lift gate, in accordance with one or more aspects of the present disclosure.
Figure 8:
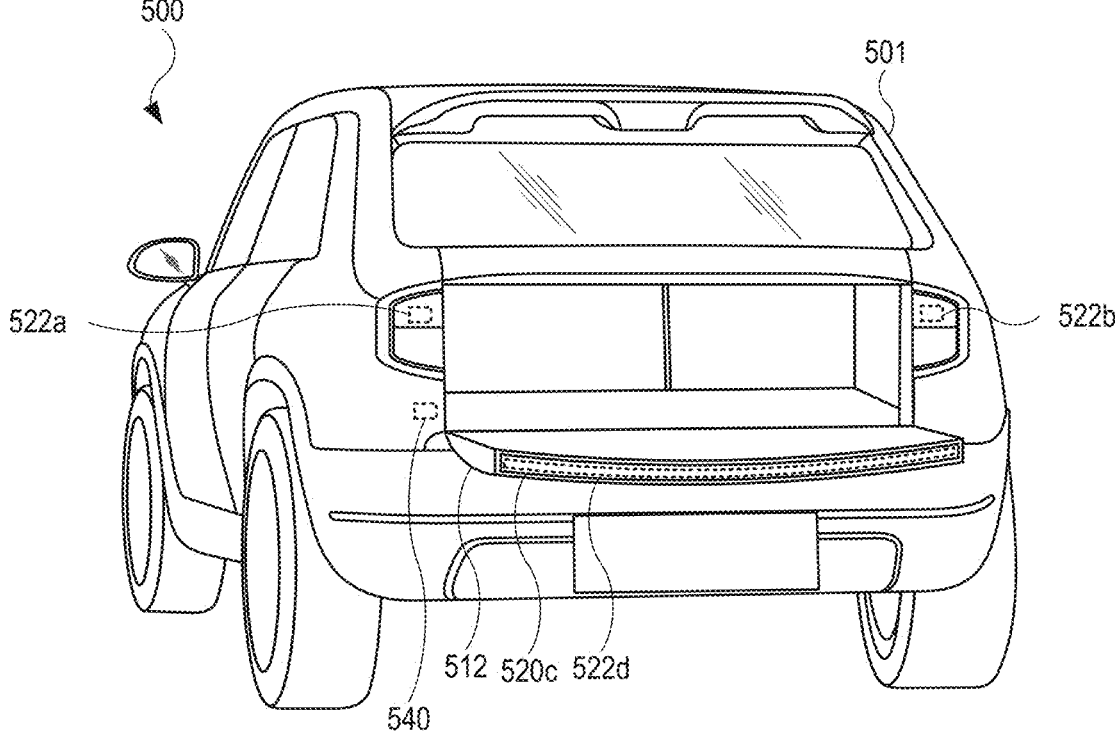

FIG. 7 and FIG. 8 illustrate rear views of an alternate example of a vehicle 500, showing an apparatus that moves with a lift gate 512, in accordance with one or more aspects of the present disclosure. The vehicle 500 includes a body 501 and the he lift gate 512 (representative of other lift gates shown and/or described herein) may take the form of a body (e.g., lift gate body) that is movable relative to the body 501, thus allowing users to insert objects into or remove objects from the vehicle 500. In this regard, the lift gate 512 may transition from a closed position (FIG. 7) to an open position (FIG. 8), or vice versa. The vehicle 500 may include an apparatus 520*a*, an apparatus 520*b*, and an apparatus 520*c*, with the apparatus 520*a*, the apparatus 520*b*, and the apparatus 520*c* having a light source 522*a*, a light source 522*b*, and a light source 522*c*, respectively. The apparatus 520*a* and the apparatus 520*b*, along with their respective light sources, are positioned on the body 501. The apparatus 520*c* and the light source 522*c* are positioned on the lift gate 512. FIG. 7 shows the lift gate 512 in a closed position and each of the light sources 522*a*, 522*b*, and 522*c* visible when illuminated to drivers, passengers and/or pedestrians behind the vehicle 500. In order to determine the position of the lift gate 512, the vehicle 500 may include a sensor 540. As a non-limiting example, the sensor 540 may take the form of a proximity sensor designed to detect the presence of the lift gate 512 and provide an indication of the closed position. Alternatively, the sensor 540 may be positioned on the lift gate 512 and may take the form of an orientation sensor (e.g., accelerator, gyroscope) that provides an indication of the closed or open position of the lift gate 512.

FIG. 8 shows the lift gate 512 in an open position. The apparatus 520*c* may further include a light source 522*d*. Based on the orientation of the lift gate 512, the light source 522*d* is visible, when illuminated, to drivers, passengers and/or pedestrians behind the vehicle 500. Accordingly, the light source 522*d* (shown as being movable with respect to the lights sources 522*a* and 522*b*) may direct light beam in different directions. This may occur by way of the light source 522d being orientated in a different direction as that of the light source 522c shown in FIG. 7. The sensor 540 may provide in indication of the open position, thus triggering the light source 522d to become active and the light source 522c (shown in FIG. 7) to become inactive. Conversely, the sensor 540 may provide in indication of the closed position (shown in FIG. 7), thus triggering the light source 522c to become active and the light source 522d to become inactive. Beneficially, the vehicle 500 can haul loads while the lift gate 512 is in the open position and still safety-based indications. Alternatively, the apparatus 520c may be covered by a transparent, or semi-transparent, lens that includes multiple surfaces (e.g., perpendicular surfaces) such that a light source is visible through the lens regardless of the open or closed position of the lift gate 512. Also, in one or more implementations, each of the light sources 522a and 522b are positioned on the lift gate 512 and thus movable with the lift. In this regard, additional light sources similar to the light sources 522a and 522b may be activate or inactive based on the position of the lift gate 512. Also, while the vehicle 500 is shown as an SUV, the vehicle 500 may alternatively take the form of a truck (e.g., vehicle 100 shown in FIG. 1).

Figure 9:
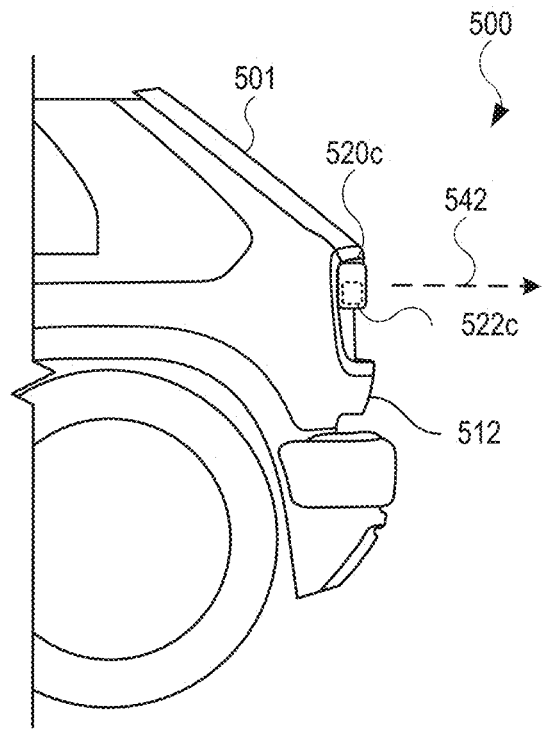
FIG. 9 and FIG. 10 illustrate alternate rear views of the vehicle shown in FIG. 7 and FIG. 8, showing the apparatus moving with the lift gate, in accordance with one or more aspects of the present disclosure.
Figure 10:
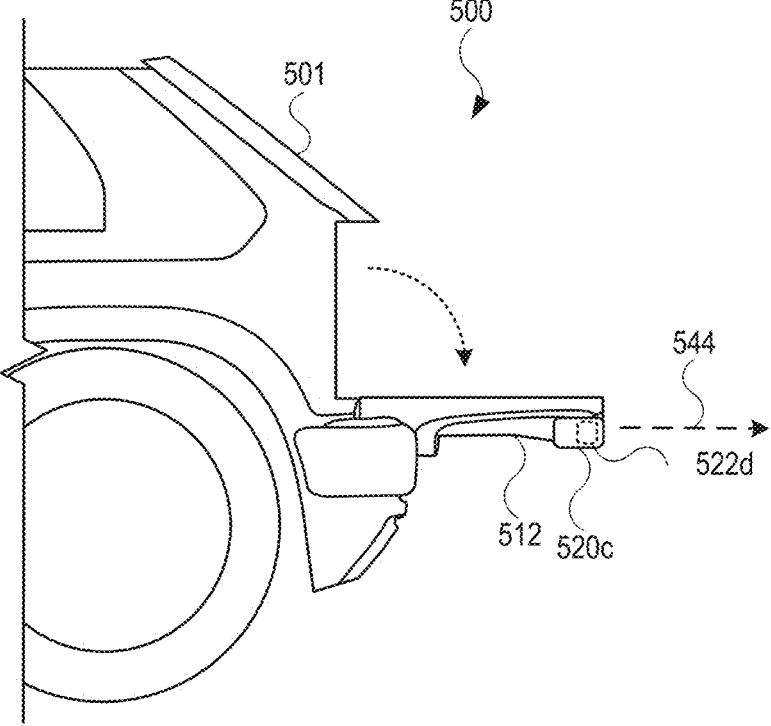

FIG. 9 and FIG. 10 illustrate alternate rear views of the vehicle 500 shown in FIG. 7 and FIG. 8, showing the apparatus 520c moving with the lift gate 512, in accordance with one or more aspects of the present disclosure. Referring to FIG. 9, the lift gate 512 is in closed position and the light source 522c, when illuminated, provides a light beam 542 away from the vehicle 500 (e.g., body 501) and in a direction perpendicular, or at least substantially perpendicular, with respect to the lift gate 512. Conversely, in FIG. 10, the lift gate 512 is in an open position and the light source 522d of the apparatus 520c, when illuminated, provides a light beam 544 away from the vehicle 500 (e.g., body 501) and in a direction parallel, or at least substantially parallel, with respect to the lift gate 512.

Figure 11:
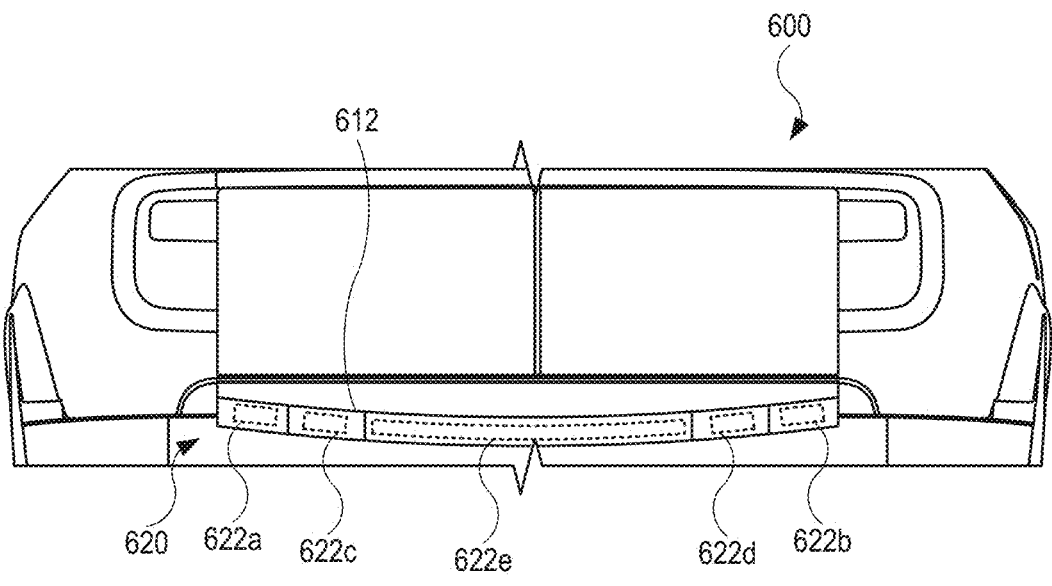
FIG. 11 and FIG. 12 illustrate rear views of alternate examples of a vehicle, showing an apparatus that moves with a lift gate, in accordance with one or more aspects of the present disclosure.
Figure 12:
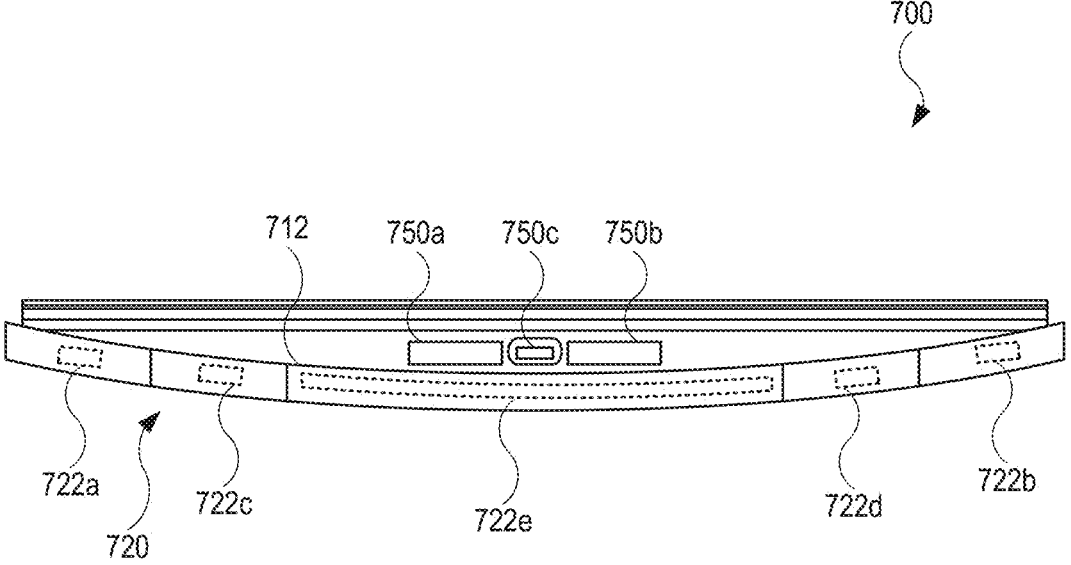

FIG. 11 and FIG. 12 illustrate rear views of alternate examples of a vehicle, showing an apparatus that moves with a lift gate, in accordance with one or more aspects of the present disclosure. In FIGS. 11 and 12, the respective lift gates are in the open position. Referring to FIG. 11, a vehicle 600 includes a lift gate 612 carrying an apparatus 620 with light sources. For example, a light source 622a and a light source 622b may function as a left turns side indicator and a right turn side indicator, respectively. Also, a light source 622c and a light source 622d may each function as a stop/braking indicator. Also, a light source 622e may function as a taillight. The light sources 622a, 622b, 622c, 622d, and 622e are at an edge, defined in part by an upper end (representing an uppermost portion), of the lift gate 612. As a result, when the lift gate 612 is in the open position, the light sources 622a, 622b, 622c, 622d, and 622e are still visible.

Referring to FIG. 12, a vehicle 700 includes a lift gate 712 carrying an apparatus (not labeled) with light sources. For example, a light source 722a and a light source 722b may function as a left turns side indicator and a right turn side indicator, respectively. Also, a light source 722c and a light source 722d may each function as a stop/braking indicator. Also, a light source 722e may function as a taillight. The apparatus 720 is at an upper end (representing an uppermost portion) of the lift gate 712. As a result, when the lift gate 712 is in the open position, the light sources 722a, 722b, 722c, 722d, and 722e are still visible. Additionally, a light source 750a, a light source 750b, and a light source 750c are shown. The light sources 750a and 750b may each function as fog light, and the light source 750c may function as a reverse light. The light sources 750a, 750b, and 750c are separate from the lift gate 712. As shown, light sources 750a, 750b, and 750c are above the lift gate 712 in the open position. However, in a closed position (not shown in FIG. 15) of the lift gate 712, the light sources 750a, 750b, and 750c are below the lift gate 712.

Figure 13:
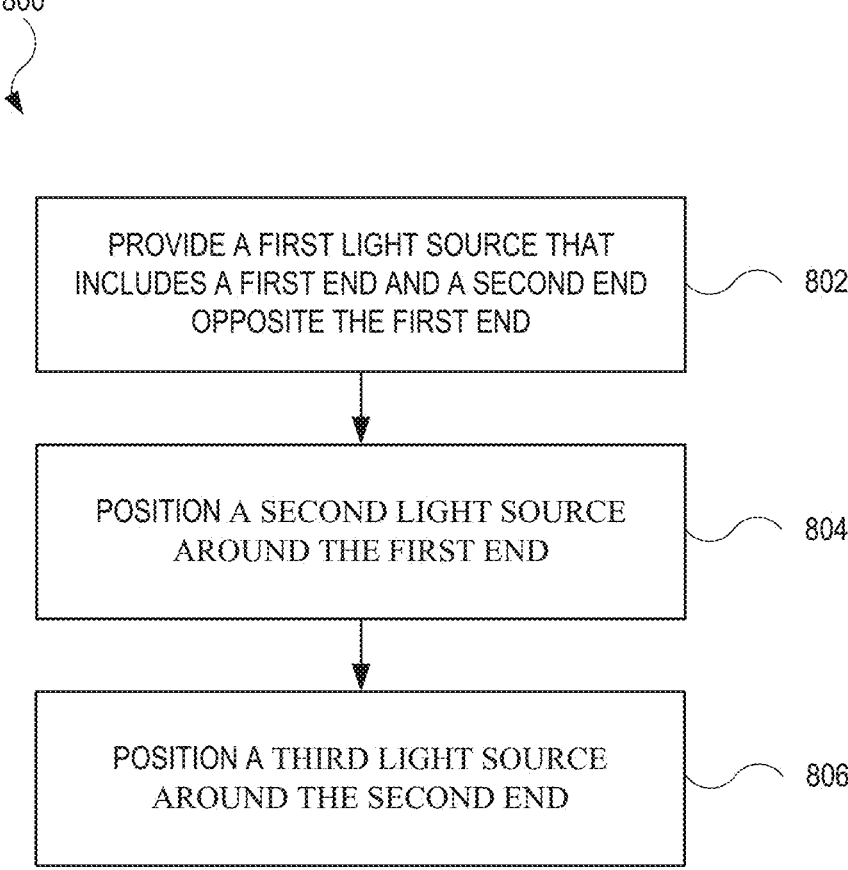
FIG. 13 illustrates a flow chart showing a process that may be performed for forming lighting features for a rear portion of a vehicle, in accordance with one or more implementations of the present disclosure.

FIG. 13 illustrates a flow chart showing a process 800 hat may be performed for forming lighting features for a rear portion of a vehicle, in accordance with one or more implementations of the present disclosure. For explanatory purposes, the process 800 is primarily described herein with reference to the light sources of FIGS. 3-12. However, the process 800 is not limited to the light sources of FIGS. 3-12, and one or more blocks (or operations) of the process 800 may be performed by one or more other components of other suitable moveable apparatuses, devices, or systems. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a first light source is provided. The first light source may include a first end and a second end opposite the first end. In one or more implementations, the first light source (e.g., light source 422c shown in FIG. 5) takes the form of a brake light.

At block 804, a second light source is positioned around the first end. In one or more implementations, the second light source (e.g., light source 422a shown in FIG. 5) takes the form of a turn signal light or side turn indicator.

At block 806, a third light source is positioned around the second end. In one or more implementations, the third light source (e.g., light source 422b shown in FIG. 5) takes the form of a turn signal light or side turn indicator. Accordingly, the second light source and the third light source are configured to illuminate to provide an indication of a vehicle, which may include an indication that the vehicle is turning.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising: a first light source comprising a first end and a second end opposite the first end; and a second light source comprising a first C-shape, the second light source surrounding, at the first end, a first plurality of surfaces of the first light source based on the first C-shape; and a third light source comprising a second C-shape, the second light source surrounding, at the second end, a second plurality of surfaces of the first light source based on the second C-shape, wherein the third light source and the third light source are configured to illuminate to provide a vehicle indicator of a vehicle.

2. The apparatus of claim 1, wherein the first light source, the second light source, and the third light source are configured to couple with a lift gate of the vehicle.

3. The apparatus of claim 2, wherein the second light source and the third light source are configured to provide the vehicle indicator in a first position of the lift gate and in a second position of the lift gate.

4. The apparatus of claim 1, wherein the first light source comprises a taillight.

5. The apparatus of claim 1, wherein each of the second light source and the third light source comprise a U-shape.

6. The apparatus of claim 1, wherein the first light source is positioned between the second light source and the third light source.

7. The apparatus of claim 1, wherein the vehicle indicator comprises a turn event for the vehicle.

8. The apparatus of claim 1, wherein the vehicle indicator comprises a braking event for the vehicle.

9. An apparatus for a vehicle, the apparatus comprising:
a body configured to transition from a first position to a second position different from the first position;
a first light source carried by the body, the first light source configured to provide a first light beam in accordance with a first indication; and
a second light source configured to provide a second light beam in accordance with a second indication different from the first indication, wherein:
in the first position, the first light source is further configured to direct the first light beam away from the vehicle and in a first direction parallel with respect to the body, and
in the second position, the second light source is further configured to direct the second light beam away from the vehicle and in a second direction parallel with respect to the body.

10. The apparatus of claim 9, wherein:
the first position comprises a closed position, and
in response to the body in the closed position, the first light beam is perpendicular with respect to the body.

11. The apparatus of claim 9, wherein:
the second position comprises an open position, and
in response to the body in the open position, the first light beam is parallel with respect to the body.

12. The apparatus of claim 9, further comprising a lens carried by the body that covers the first light source and the second light source, wherein the lens defines an edge of the body.

13. The apparatus of claim 9, wherein:
the second light source is carried by the body, and
the second light source is further configured to direct the second light beam away from the vehicle in the first position or the second position.

14. The apparatus of claim 9, wherein:
the first light source comprises a taillight, and
the second light source comprises a brake light.

15. The apparatus of claim 14, wherein the second light source at least partially surrounds the first light source.

16. The apparatus of claim 9, wherein the first light source is movable with respect to the second light source based on the body moving from the first position to the second position.

17. A vehicle, comprising:

a vehicle body;

a first apparatus coupled with the vehicle body, the first apparatus comprising a first light source and a lens that covers the first light source;

a spoiler coupled with the vehicle body, the spoiler at least partially covering the lens;

a lift gate coupled with, and rotatable with respect to, the vehicle body;

a second apparatus carried by the lift gate, the second apparatus comprising:

a first light source comprising a first end and a second end opposite the first end;

a second light source that surrounds the first end; and a third light source that surrounds the second end, wherein the second light source and the third light source are configured to simultaneously illuminate to provide an indication.

18. The vehicle of claim 17, wherein:

the spoiler defines a space between the vehicle body, and the lens at least partially protrudes from the spoiler.

19. The vehicle of claim 17, further comprising a fog light, wherein:

the fog light is below the lift gate in a closed position of the lift gate, and the fog light is above the lift gate in an open position of the lift gate.

20. The vehicle of claim 17, wherein the second light source and the third light source are configured to provide a vehicle indicator in a first position of the lift gate and in a second position of the lift gate.

\* \* \* \* \*